United States Patent [19]
Ignatjev

[11] 3,779,584
[45] Dec. 18, 1973

[54] FLUIDIC CONNECTOR

[75] Inventor: Vladimir Ignatjev, Norwalk, Conn.

[73] Assignee: Pitney-Bowes, Inc., Stamford, Conn.

[22] Filed: Sept. 22, 1971

[21] Appl. No.: 182,630

[52] U.S. Cl................ 285/137 R, 277/166, 285/71, 285/197, 285/379, 277/233
[51] Int. Cl............................................. F16l 39/00
[58] Field of Search............... 285/137, 131, 9, 285/65, 70, 71, 364, 379, 197, 198, 199; 137/561, 594; 277/166, 233

[56] References Cited
UNITED STATES PATENTS

| | | | |
|---|---|---|---|
| 180,140 | 7/1876 | Lundgren............................ | 292/246 |
| 3,052,489 | 9/1962 | Stoudt................................. | 285/379 |
| 2,447,185 | 8/1948 | Keim.................................. | 285/137 R X |
| 2,125,542 | 8/1938 | Catterlin........................... | 137/594 X |
| 3,580,615 | 5/1971 | Prosser.............................. | 285/137 R X |
| 3,469,863 | 9/1969 | Riester et al...................... | 285/137 R |
| 1,019,000 | 2/1912 | Watson............................... | 285/364 X |
| 2,986,412 | 5/1961 | Schmid............................... | 285/364 |
| 3,640,552 | 2/1972 | Demler............................... | 285/137 R |

*Primary Examiner*—Jordan Franklin
*Assistant Examiner*—Wayne L. Shedd
*Attorney*—Alan H. Levine

[57] ABSTRACT

A two-piece type connector assembly for effectively mutually coupling a plurality of fluid conducting passages. Two body members formed from identical molded parts are provided with flat pressure surfaces, each such surface having mounted thereon a rubber-like pad and a layer of plastic film so that when the body members are held together the plastic films are in mutual sealing contact so as to afford an effective air tight coupling between the respective fluid conducting passages formed in said body members.

2 Claims, 4 Drawing Figures

PATENTED DEC 18 1973 3,779,584

INVENTOR
VLADIMIR IGNATJEV
BY Albert W. Scribner
ATTORNEY

FLUIDIC CONNECTOR

BACKGROUND OF THE INVENTION

With the increased use of fluidic elements and circuits has come the need for an efficient means for coupling one or more fluid conducting tubes or tubing to and/or between fluid amplifiers, input devices, output devices and the like. In operation these coupling means must be readily mutually connectable and disconnectable by the application of very light forces and must have a reliable air-tight seal when the coupling members are operatively secured together: also there must be no likehood of fracture of any connector projections nor can there be any restrictions formed in the fluid conductive passages of the connector by reason of the members being interconnected.

The primary object of instant connection is to provide a connector arrangement which meets the above noted requirements and which is inexpensive to produce and simple to manipulate.

Another object of the invention is to provide a two-member type connector arrangement wherein each member has secured thereto a pad of rubber-like material and a layer of plastic film; the two layers of plastic film being in mutual contact when said members are interconnected whereby the combination provides an air-tight seal between the fluid conducting passages of the respective connector members.

A further object of the invention is to provide a novel two-member type connector arrangement wherein each member is formed from identical parts.

Other objects of the invention will become apparent as the disclosure progresses. In the drawings.

Figure 1:
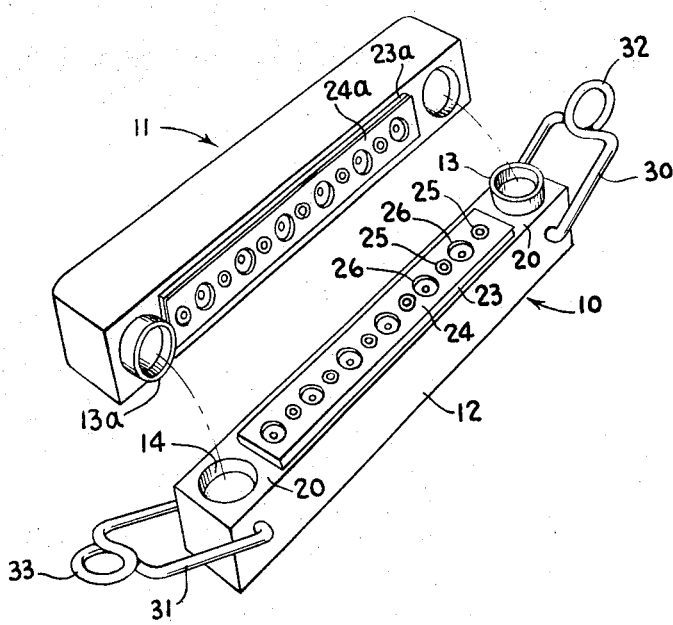
FIG. 1 is a perspective view illustrating a separated condition for the instant two-piece connector arrangement.

Referring to the drawings, FIG. 1 illustrates the general construction and arrangement of the instant two-piece connector. Here first and second body members 10 and 11 are constructed from identical plastic (e.g. Delrin or Cycolac) molded parts and hence a detailed description of only the first member 10 will suffice here with notation being made of the alterations of said first member which make it different from the second member 11. Body member 10 is made from a plastic molding and includes a body portion 12 having an inner side that is formed at one end with a cylindrical locating projection 13 and is formed at the other end thereof with a correspondingly shaped and sized cylindrical locating recess 14. The outer side of body member 10 is formed with an elongated longitudinal recess 15 in which is disposed a uniformily spaced laterally aligned set of tubular projections 16 having axes that are disposed in the central plane of said member 10. Fluid conducting passages 17 are formed through each projection 16 and extend through the body portion 12, the respective ends of said passages 17 terminating adjacent the said inner and outer sides of said member 10.

On the said inner side of said body member 10 between locating projection 13 and recess 14 there is formed a flat pressure surface 20 which is formed with a plurality of relatively short uniformily laterally spaced tubular projections 21. Projections 21 are arranged so that every other one of said laterally aligned fluid conducting passages 17 extends coaxially through said projection 21 while the remaining passages 16 terminate at ports 22 in the face of said pressure surface. The purpose for projections 21 will become apparent below.

Figure 4:
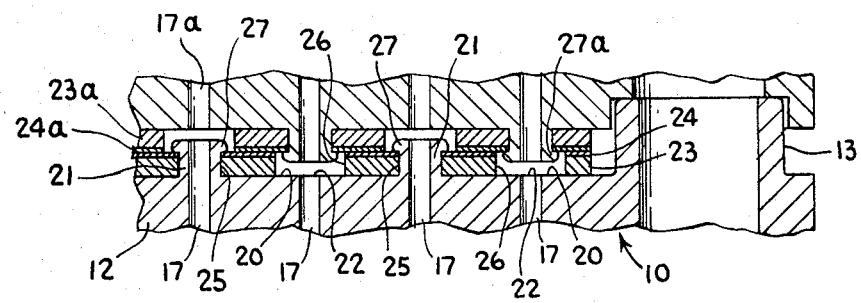
FIG. 4 is a fragmentary sectional view taken along section line 4—4 of FIG. 3.

Superimposed on the pressure surface 20 is a rectangular pad 23 of rubber-like material that is approximately 0.031 inch thick, and superimposed on pad 23 is a correspondingly shaped rectangular layer of flexible film 24 that is approximately 0.010 inch thick and may be made of mylar, aluminum foil or other material that is dimensionally stable. The pad 23 and film 24 have a plurality of laterally aligned registering holes formed therein which respectively correspond in location to that of said passages 17; these holes being of two different diametrical sizes and alternately dispersed. Starting with the passage 17 nearest the locating projection 13 there is a relatively small hole 25 in pad 23 and film 24 having a diameter just large enough to slide over the outside of the associated tubular projection 21. The next pad and film hole 26 is relatively large, while the following hole 25 is small, and so forth in successive alternate sizes throughout the effective length of the flat pressure surface 22; the last hole being a relatively large sized hole 26. The outer ends 27 of projections 21 are peened over or otherwise slightly enlarged as to thereby secure the pad 23 and the film 24 to said flat pressure surface 20 of the first body member 10, the diameter and depth of the said larger holes 26 being such as allow unrestricted entry of the corresponding peened projection ends 27a of the second body member 11 as is illustrated in FIG. 4.

Figure 2:
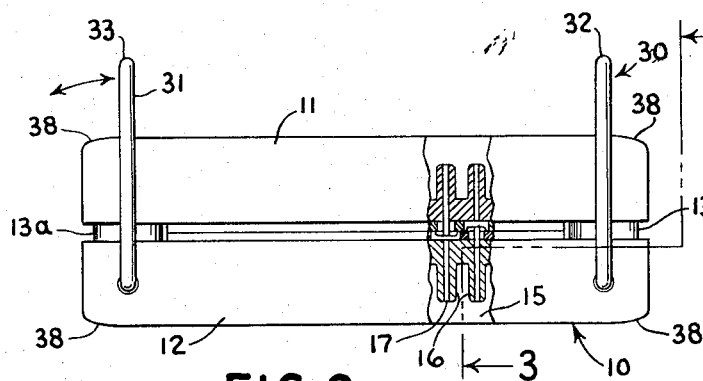
FIG. 2 is a front elevational view in partial section showing the assembled condition of the instant connector.
Figure 3:
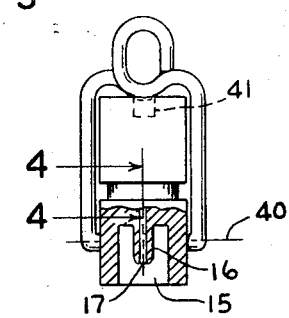
FIG. 3 is an end view of the apparatus of FIG. 2.

The second body member 11 and its associated pad 23a and film 24a are constructed and arranged in the same manner as that above described for member 10 and its pad 23 and film 24. Under these conditions the two members 10, 11 may be mutually assembled as is shown in FIGS. 2 and 3 so that the locating projection 13a of member 11 engages the recess 14 of member 10 and the locating projection 13 of member 10 engages the recess 14a of member 11. Further, the projections 21, 21a of said members 10, 11 respectively extend into the associated adjacent large size holes 26, 26a so that the plastic films 24 and 24a may make the desired mutual sealing contact. When so mutually positioned, the members may be pressed together with the now mutually contacting surfaces of the mylar films forming an air-tight seal around the inner ends of the respectively associated fluid conducting passages 17 and 17a of said members. Latching means are provided for releasably securing the body members 10, 11 together in this operative assembled condition, such means including a pair of wire clips or clamps 30, 31 which are each pivotally mounted on member 10 at a pivot axis 40, FIG. 3, and which have looped outer ends 32, 33 respectively that are adapted to swing into cammed clamping engagement with the outer end surfaces of the member 11, as illustrated in FIG. 2, so as to thereby clamp said members with sufficient force to establish said air-tight seal. As will be apparent the clips may be readily swung to their open positions so that the body members 10, 11 may be readily disassembled as illustrated in FIG. 1. Very light forces are required to effect the above identified assembly and disassembly operations, the outer corners of the molded members 10, 11 having rounded contours as indicated at 38 of FIG. 2 to facilitate the swinging of clips 30, 31 into and out of their respective clamping positions. When in their FIG. 2 positions the looped portions of clips 30, 31 respectively engage detent recesses or holes, such as illustrated at 41 of FIG. 3, formed in the adjacent portions of body member 11 whereby said clips are yieldably retained in their clamping positions; the said looped portions of the clips thus affording a yieldable detenting and clamping action. The only differences between body members 10 and 11, as finally formed, are the clips 30, 31 and mounting holes therefor associated with body member 10 and the detent holes such as 41 associated with the second body member 11.

The tubular projections 16 are adapted to be coupled to external tubing so that when each member is so connected to a plurality of fluid conducting tubes or lines, the instant connector arrangement affords a means for very quickly and easily coupling and uncoupling the tubing or lines of member 10 to and from the respectively associate tubing or lines of member 11 by the application of very light forces. At all times the tubular projections are shielded from most external contacts or impacts by the walls forming said recess 15 and hence fracture or breakage of these projections is virtually eliminated. It will thus be seen that the instant two-piece connector arrangement is very simple in construction, is easy to use, and can be produced at low cost particularly in view of the fact that the body members 10, 11 are formed from identical molded plastic parts. Extended testing indicates that the instant arrangement affords reliable service over extended periods of time.

I claim:

1. A two-piece type connector, comprising:
  a first body member formed with a pressure surface on one side thereof and having a plurality of fluid conducting passages formed therethrough and respectively terminating adjacent said surface;
  said body member also being formed with a locating recess and a locating projection along said one side thereof;
  a pad of rubber-like material and a layer of flexible film carried by said first member and being provided with apertures corresponding in location to the ends of said passages, said rubber-like pad being disposed on said pressure surface with said apertures aligned with said passages;
  said body member having shoulder means surrounding some of the fluid conducting passages and overlying said pad for positively preventing the pad from being removed from the pressure surface;
  a second body member formed similar to said first body member and carrying a pad similar to that for said first body member;
  one of said members having a plurality of tubular projections that respectively communicate with the said fluid conducting passages formed in said one member; and
  first and second spring clips mounted on said first member, each spring clip having a looped portion adapted to detentingly engage one of two recesses formed in the second body member, for releasably securing said first and second body members together so that said locating projections and recesses are in respective engagement and said pad are in pressure contact so that an air-tight coupling is thereby established between the respective adjacent ends of associated pairs of fluid conducting passages in said body members.

2. A connector as defined in claim 1 including a layer of flexible film carried by each body member, said rubber-like pad being disposed between said film layer and said pressure surface, said film layer being provided with apertures corresponding in location to the ends of said passages, and said shoulder means positively preventing said film layer from being removed from the body member.

* * * * *

UNITED STATES PATENT OFFICE
CERTIFICATE OF CORRECTION

Patent No. 3,779,584   Dated December 18, 1973

Inventor(s) Vladimir Ignatjev

It is certified that error appears in the above-identified patent and that said Letters Patent are hereby corrected as shown below:

First page, left column, line 5, change "Pitney-Bowes, Inc." to ---Automatic Switch Company, Florham Park, N. J.---

Signed and sealed this 23rd day of April 1974.

(SEAL)
Attest:

EDWARD M.FLETCHER,JR.          C. MARSHALL DANN
Attesting Officer              Commissioner of Patents